June 28, 1932.    A. J. AMSLER    1,865,070
UNIVERSAL TESTING MACHINE
Filed July 5, 1929    3 Sheets-Sheet 1
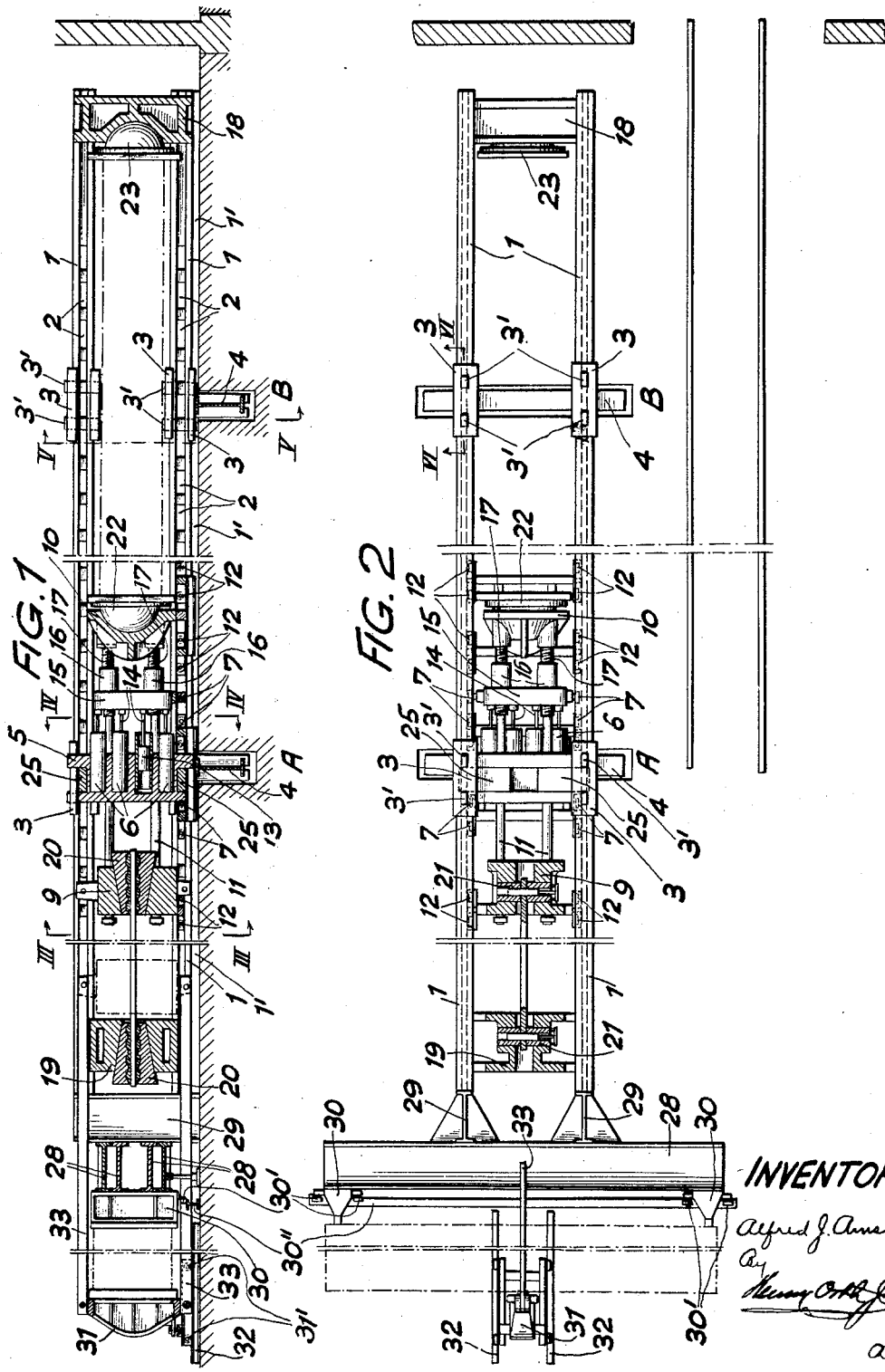

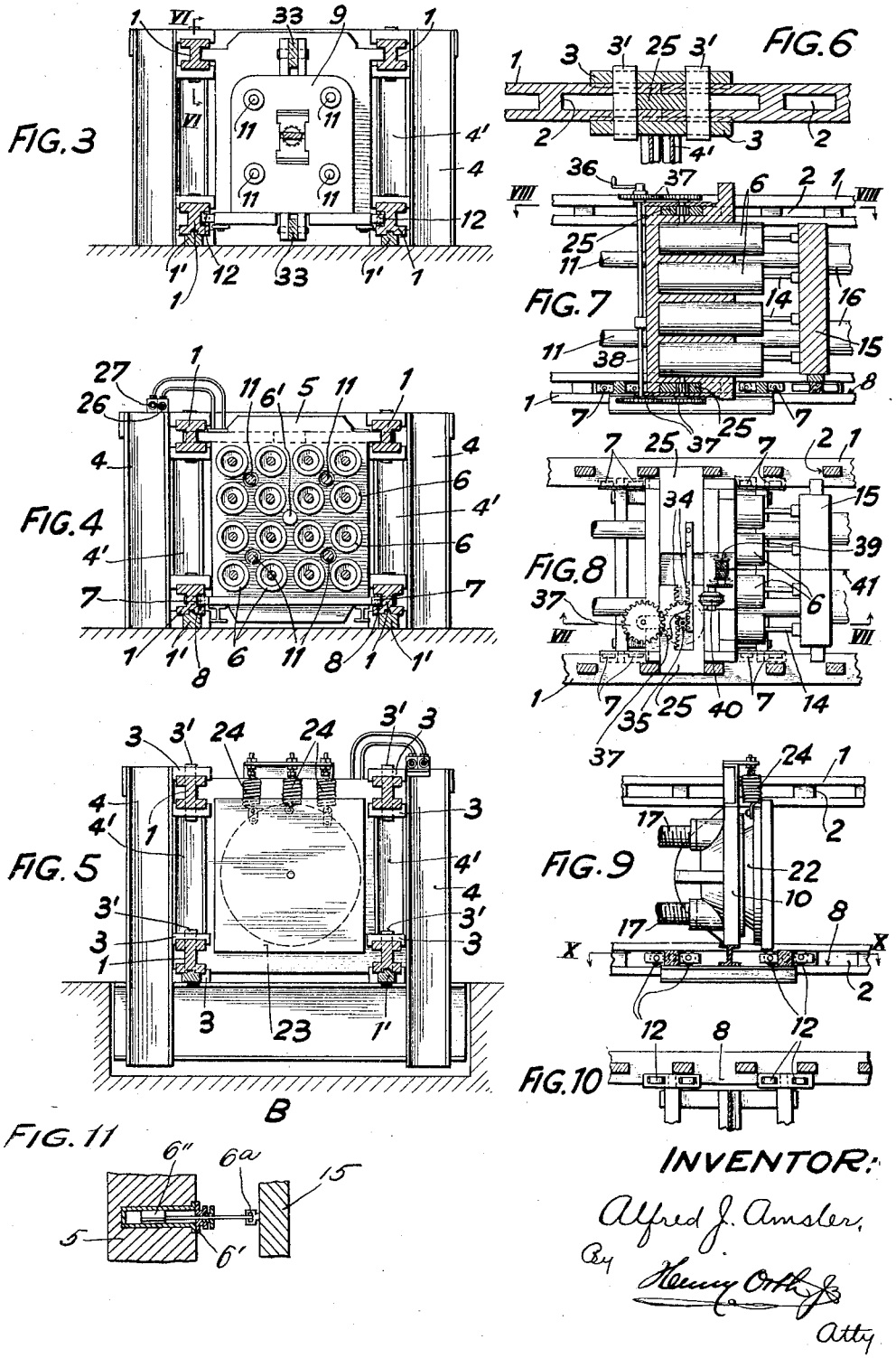

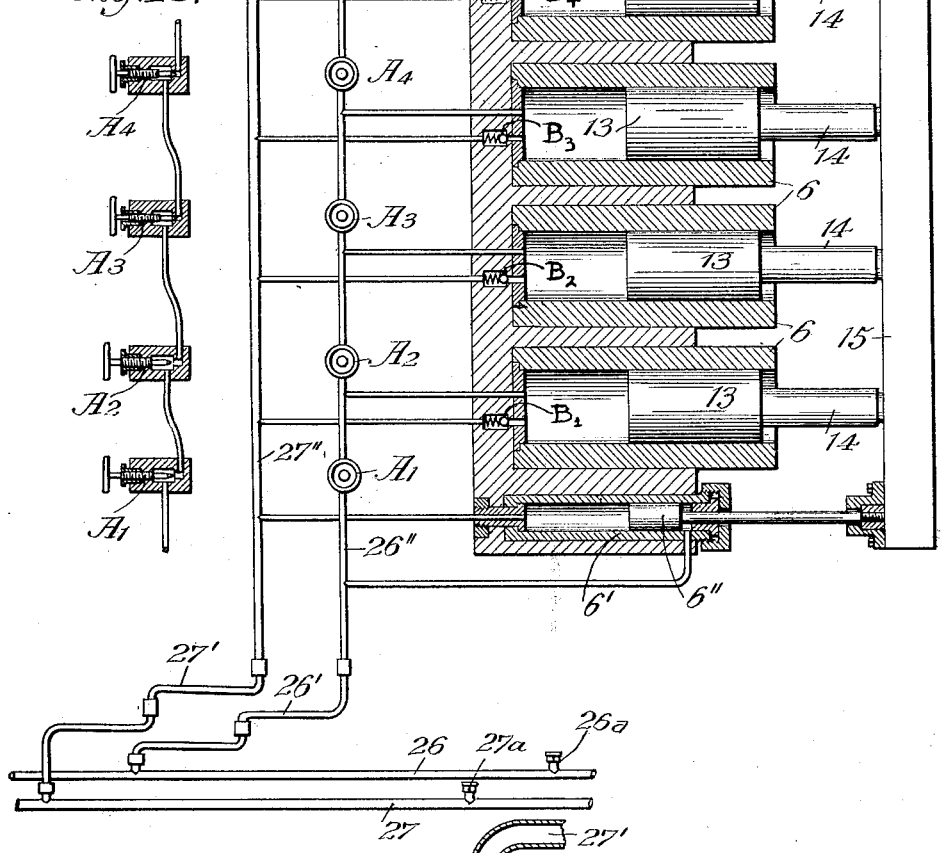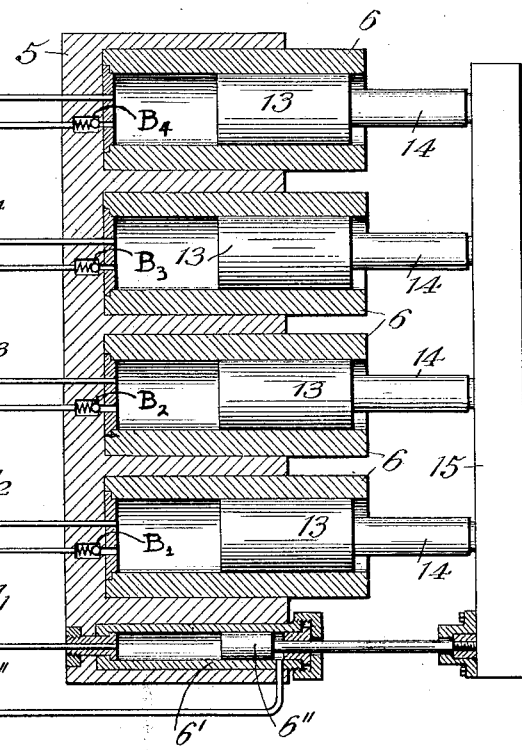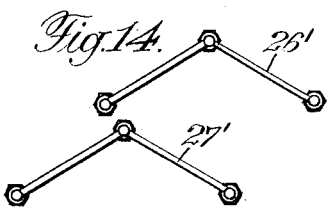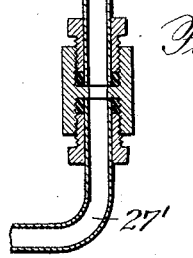

Patented June 28, 1932

1,865,070

UNITED STATES PATENT OFFICE

ALFRED J. AMSLER, OF SCHAFFHAUSEN, SWITZERLAND

UNIVERSAL TESTING MACHINE

Application filed July 5, 1929, Serial No. 376,235, and in Germany May 14, 1929.

The subject matter of the present invention is a universal testing machine operated by liquid under pressure and adapted to subject test specimens of greatly varying length and of greatly varying resistance to tension or compression tests or to transverse tests under small loads as well as under the highest practical loads.

The testing machine according to the present invention comprises a frame, a casing carrying the press-pots and displaceable along said frame for being adjusted to the length of a test specimen, and a locking device adapted to lock the casing in its adjusted position to the frame.

Preferably the casing carrying the press-pots is constructed as a carriage displaceable along the frame and movable within a second carriage which is also displaceable along the frame. This second carriage is provided on one side of the press-pot carriage with a gripping head for tensile tests and on the other side of the press-pot carriage with a cross-head carrying the plate for compression tests, there being a rigid connection between these two heads. Other stationary heads cooperating with and opposite the heads of the second carriage for holding the test specimen being rigidly connected to the frame.

A constructional example of the subject matter of the present invention is illustrated on the accompanying drawings, in which:

Fig. 1 is an elevation with parts shown in section of the testing machine,

Fig. 2 is a plan view of the testing machine, parts of which being shown in a horizontal section, Fig. 3 is a vertical section along line III—III in Fig. 1, Fig. 4 is a vertical section along line IV—IV in Fig. 1, Fig. 5 is a section along line V—V in Fig. 1.

Fig. 6 shows a detail in a section along line VI—VI in Fig. 2,

Fig. 7 is a vertical section along line VII—VII in Fig. 8,

Fig. 8 is a horizontal section along line VIII—VIII in Fig. 7,

Fig. 9 is an elevation of the head for compression tests on the second carriage, Fig. 10 shows a detail in a section along line X—X in Fig. 9, Fig. 11 is a central vertical section of press-pot 6', Fig. 12 is a schematical horizontal section of the press-pots showing the connections to the oil conduits, Fig. 13 is a vertical section through the distributing valve, and Figs. 14 and 15 show details.

Referring now to the drawings the frame of the testing machine comprises four horizontal beams or girders 1 of I-shaped cross-section and arranged to form the edges of a four-sided prism having a rectangular base. The webs of the girders 1 are provided with a row of gaps 2 arranged at regular distances. Depending on the total length of the machine the girders of the frame are composed of several individual lengths of girders joined to each other. In the present example two such jointing places A and B are shown and Fig. 5 shows in cross-section such a joint while Fig. 6 illustrates a detail. In such a joint above and below the girders butting with their ends against each other butt straps 3 are secured to the ends of the girder sections by means of vertical locking members 3'. The latter are of rectangular cross-section and their width and thickness corresponds to the dimensions of the web between two apertures 2 and they replace a web so that the regular distances of the apertures are not impaired by a joint of two girders. At the joint a yoke made of girders 4 and stanchions 4' is provided. The four girders 1 are at their ends rigidly connected to each other by heads for holding the test specimen which will be described later. The two lower girders 1 rest loosely on longitudinal sleepers 1' which arrangement permits an alteration in the length of the frame owing to the testing loads sustained or to temperature influences or a longitudinal displacement of the frame caused by forces generated at the rupture of a test piece.

Within the frame and longitudinally of the latter a casing 5 carrying the press-pots 6 is displaceable and is constructed in the manner of a carriage having rollers 7 running on the inner lower flanges of the lower girders 1. Similar rollers may be provided to run on the upper girders.

The casing 5 with the press-pots 6 is situated within a second carriage which comprises a gripping head 9 for tension tests and a head 10 for compression tests, the two heads being rigidly connected with each other by means of four rods 11. The second carriage, which thus forms a rigid unit, rests on rollers 12 which, as the rollers 7 of the press-pot carriage, run on the lower inner flanges of the lower girders, so that also the second carriage may be displaced along the girders. In Figs. 9 and 10 the rollers 12 provided below the head 10 for compression tests are shown.

On the casing 5 sixteen press-pots 6 are arranged and adapted to cooperate in groups of two or more or all together, in order to obtain different graduations in the load developed by the testing machine. The press-pots are adapted to cooperate in groups of two or more by pressure liquid being supplied to the number of press-pots which it is desired to be operative in every special test. In this supply distributing valves are interposed in the manner well known in the art, and the valves are so actuated that those groups of press-pots, the individual members of which are symmetrically disposed to the center line of the press, are operative, in order to obtain a resultant force passing through said center line.

The liquid distribution to the press-pot groups is not a novel feature of my invention.

Fig. 12, 26 denotes the oil conduit supplying pressure oil to the cylinders 6, and 27 is the conduit returning the used pressure oil to the reservoir of the pressure pump. Each of the two conduits 26 and 27 is connected by means of adjustable pipes 26' and 27' respectivey to pipes 26" and 27". Each adjustable pipe consists of two parts (Fig. 14) the inclination of which may be altered and connected together by a joint shown in detail in Fig. 15. A plurality of tappings 26$^a$ are provided along the conduits 26 and 27 so that the pipes 26" and 27" may be connected to the conduits 26 and 27 in any position of the carriage on which the casing 5 with the press pots 6 is mounted.

In the pipe 26" four valves $A_1$, $A_2$, $A_3$ and $A_4$ are inserted for successively shutting off groups of cylinders 6. In Fig. 13 the valves $A_1$ and $A_2$ are open and the valves $A_3$ and $A_4$ closed. The pressure oil can thus enter the first and second group of the press-pots, but not the third and fourth group.

The pipe 27" is connected to the press-pots and ball valves $B_1$, $B_2$, $B_3$ and $B_4$ are inserted in these connections, which valves prevent oil from the return pipe 27 entering the cylinders but permit oil from the cylinders to flow into the return pipe 27. The cylinder 6' with the piston 6" serves for returning the rams 13 into their initial position. The cylinder 6' is shown at one end of the cylinders 6 for clearness sake although it is arranged in the centre of the casing 5 as is shown in Fig. 4. The cylinder space to the left of the ram 6" is connected to the return pipe 27" and the space to the right of the ram is connected to the supply pipe 26". When the rams 13 work the return conduit 27 is closed against the oil reservoir of the pump and the same pressure is present in the return conduit as in the supply conduit. Therefore the same pressure acts on both ends of the piston 6" and it works in the same direction as the rams 13 with a pressure corresponding to the difference of the cross-sections of the piston 6" and its piston rod. When the return conduit is connected to the reservoir of the pump by opening a valve and when the valve $A_1$ is closed, the conduit 27, the cylinders 6 and the left hand side of the cylinder 6' are relieved of the pressure whilst on the right hand side of the piston 6" the pressure acts and causes the rams 13 to be returned into their initial positions.

The rams 13 of the press-pots act by means of stilts 14 against a press plate 15 forming part of the press-pot carriage and force the plate 15 against nuts 16 provided on the screw threaded part of the rods 11. 6' denotes a press-pot operating in the opposite direction to that of the remaining press-pots and by means of which the plate 15 may be pulled towards the casing 5 and the rams 13 of the press-pots may be returned into their initial position; furthermore the press-pot 6' serves as a buffer for absorbing shocks occurring at the rupture of a test piece. The plate 15 is securely connected at 6$^a$ to the ram 6", whereby pressure liquid admitted to the right hand side of the ram 6" causes the plate 15 to be pulled towards the casing 5. At the right hand end (looking at Figs. 1 and 2) of the four girders 1 and head 18 for compression tests is rigidly connected to the girders, the space to the right of the press-pots being reserved for carrying out compression tests whilst the left hand part of the machine is intended for carrying out tension tests, and a gripping head 19 for tension tests is rigidly fixed to the left hand ends of the girders 1.

The fixation of the test specimen in the gripping heads 9 and 19 for tension tests may be carried out in any suitable manner, for instance, by means of self locking wedges 20 (Fig. 1) or by means of bushes and pins 21 (Fig. 2). The heads 10 and 18 for compression tests are provided with a spherical recess with which a similarly shaped part of a plate 22 or 23 respectively cooperates for permitting an adjustment of these plates to correspond to the pressed surfaces of the specimen subjected to compression tests. To ensure this adjustability of the plates 22 or 23 respectively the latter are suspended by springs 24 as is shown in Figs. 5 and 9.

In order to prepare for a tension or compression test the two carriages are together displaced in the frame of the machine so far that, for instance, with a compression test, the plate 22 gets into contact with the test specimen previously inserted in the machine, whereupon by turning the nuts 16 on the screw-threaded rods 7 the press-pot carriage is forced back until it is possible to insert the cross-bolts 25 into the corresponding gaps 2 of the girders 1. Thereupon the press-pot carriage is locked to the frame by pushing the cross bolts 25 through the gaps of both upper and both lower girders 1. The casing 5 is provided at top and bottom with a recess in which the cross-bolts 25 are guided and means are provided to permit the operator, who preferably stands on a platform provided on the press-pot carriage, to insert or withdraw the cross bolts from one point. To this end the cross-bolts 25 are provided with racks 34 with which a pinion 35 meshes. The pinions 35 of the upper and lower side of the casing 5 are actuated by a crank 36, gear wheels 37 and shaft 38 (Figs. 7 and 8).

The press-pots are connected up to the conduit 26 supplying oil under pressure and arranged parallel to the frame and provided with tapping points; the return conduit 27 is similarly arranged and equipped. The number of press-pots necessary to produce the desired pressure are then rendered operative. By the action of the press-pots the second carriage is moved towards the right relatively to the press-pot carriage which is locked to the frame and the test specimen is subjected to compression; in a similar manner a test piece may be subjected to tension.

For facilitating the displacement of both carriages along the frame a winch 39 driven by an electric motor 40 supplied with current through a flexible cable (not shown) may be provided on the carriage of the press-pots and the rope 41 for attachment at either end of the machine may run along the machine as is indicated in Fig. 8; the second carriage is caused to take part in the displacement movement of the press-pot carriage.

In order to be able to carry out bending tests with this testing machine at one end of the girders 1 a number of transversely arranged H-girders 28, for instance four girders 28, are provided resting against the girders 1 by the intermediary of girders 29. The end supports or edges 30 for the test piece rest against the girders 28. The end supports are constructed as carriages having wheels 30' which run on transverse rails 30'' placed along the girders 28 for adjusting the supports to the desired span. The middle support acting upon the test piece is constructed as carriage 31 provided with roller 31' to move on rails 32; the carriage 31 is pulled in the direction of the girders 1 by the influence of the press-pots to which it is operatively connected by tie rods 33 arranged on top and bottom and connecting the carriage 31 up to the gripping head 9.

Obviously the universal testing machine may also be built with a vertical frame.

The above described universal testing machine may be built for highest loads needed in practical testing and for very great lengths, in contradistinction to the hitherto known testing machines provided with screw threaded spindles and a single press-pot, which are very limited as regards both load and length.

I claim:

1. A universal testing machine operated by liquid under pressure, comprising in combination, a frame, a casing, press-pots provided on said casing, said casing being arranged as a carriage displaceable along said frame, a second carriage displaceable along said frame, said press-pot carriage being arranged within said second carriage, two movable heads one forming a gripping head for tension tests and the other a head for compression tests forming part of said second carriage, and stationary heads cooperating with the movable heads of said second carriage and rigidly fixed to said frame.

2. A universal testing machine operated by liquid under pressure, comprising in combination, a frame, a carriage, press-pots provided on said carriage, said carriage being displaceable along said frame, a second carriage displaceable along said frame, said press-pot carriage being arranged within said second carriage, two movable heads one forming a gripping head for tension tests and the other a head for compression tests forming part of said second carriage, rods screw threaded over part of their length for rigidly connecting to each other the two heads of said second carriage, nuts on said rods, a plate on said press-pot carriage, means for transmitting the pressure exerted by said press pots to said plate to urge the latter against said nuts for transmitting pressure to said second carriage and its heads, and stationary heads cooperating with the movable heads of said second carriage and rigidly fixed to said frame.

3. A universal testing machine operated by liquid under pressure, comprising in combination, a frame formed of parallel horizontal I-girders and each having a row of gaps in its web, a casing, press-pots provided on said casing, the casing being displaceable along said frame to have its position adjusted according to the length of the test specimen, and locking members provided on said casing and adapted to enter said gaps for locking said casing in its adjusted position to said frame.

4. A universal testing machine operated by liquid under pressure, comprising in combination, a frame formed of parallel horizontal I-girders and each having a row of gaps in its web, a casing, press-pots provided on said casing, said casing being arranged as a carriage displaceable along said frame, a second carriage displaceable along said frame, said press-pot carriage being arranged within said second carriage, two movable heads one forming a gripping head for tension tests and the other a head for compression tests forming part of said second carriage, rods screw threaded over part of their length for rigidly connecting to each other the two heads of said second carriage, nuts on said rods, a plate on the press-pot carriage, means for transmitting the pressure exerted by said press pots to said plate to urge the latter against said nuts to transmit pressure to said second carriage and its heads, and stationary heads cooperating with the movable heads of said second carriage and rigidly fixed to said frame.

5. A universal testing machine operated by liquid under pressure, comprising in combination, a frame formed of parallel, horizontal I-girders each having a row of gaps in its web, a casing, press-pots provided on said casing, the casing being displaceable along said frame to have its position adjusted according to the length of the test specimen, locking members provided on said casing and adapted to enter said gaps for locking said casing in its adjusted position to said frame, and longitudinal sleepers on which said frame loosely rests to permit an alteration of the length of the frame girders caused by the testing stresses or temperature influences.

6. A universal testing machine operated by liquid under pressure, comprising in combination, a frame formed of parallel, horizontal I-girders each having a row of gaps in its web, a casing, said girders being composed in length of several individual girders, means to join said individual girders to each other, which means include butt straps extending over the flanges of the adjoining girder ends and cross bolts fixing said butt straps to said flanges and replacing the web of said girders at the jointing place, a casing, press-pots provided on said casing, the casing being displaceable along said frame to have its position adjusted according to the length of the test specimen, locking members provided on said casing and adapted to enter said gaps for locking said casing in its adjusted position to said frame.

7. A universal testing machine operated by liquid under pressure, comprising in combination, a frame formed of parallel, horizontal I-girders, each having a row of gaps in its web, a casing, press-pots provided on said casing, the casing being displaceable along said frame to have its position adjusted according to the length of the test specimen, locking members provided on said casing and adapted to enter said gaps for locking said casing in its adjusted position to said frame, and means for carrying out bending tests, which means include a frame part transversely arranged to the frame of the machine and resting against the latter, two supporting edge members, carriages on which said edge members are mounted, displaceable along said transverse frame part, a middle edge member, a carriage on which said middle edge member is mounted and displaceable in the direction of said frame, and means to connect said middle edge member to one of said movable heads.

In testimony whereof I have signed my name to this specification.

ALFRED J. AMSLER.